United States Patent
Walsh

(10) Patent No.: US 8,739,032 B2
(45) Date of Patent: May 27, 2014

(54) METHOD AND SYSTEM FOR DOCUMENT PRESENTATION AND ANALYSIS

(76) Inventor: Patrick Sander Walsh, Alexandria, VA (US)

( * ) Notice: Subject to any disclaimer, the term of this patent is extended or adjusted under 35 U.S.C. 154(b) by 172 days.

(21) Appl. No.: 13/501,370

(22) PCT Filed: Oct. 12, 2010

(86) PCT No.: PCT/US2010/052321
§ 371 (c)(1),
(2), (4) Date: Apr. 11, 2012

(87) PCT Pub. No.: WO2011/044579
PCT Pub. Date: Apr. 14, 2011

(65) Prior Publication Data
US 2012/0204104 A1    Aug. 9, 2012

Related U.S. Application Data

(60) Provisional application No. 61/250,557, filed on Oct. 11, 2009.

(51) Int. Cl.
*G06F 17/27* (2006.01)
(52) U.S. Cl.
USPC ........... 715/273; 715/277; 707/706; 707/708; 707/722; 707/723; 707/728; 707/748; 707/749; 707/750
(58) Field of Classification Search
USPC .......... 715/273, 277; 707/706, 708, 722, 723, 707/728, 748–750
See application file for complete search history.

(56) References Cited

U.S. PATENT DOCUMENTS

| | | | | |
|---|---|---|---|---|
| 5,305,208 | A * | 4/1994 | Doi et al. | 715/210 |
| 5,369,577 | A * | 11/1994 | Kadashevich et al. | 704/9 |
| 5,845,278 | A * | 12/1998 | Kirsch et al. | 707/688 |
| 5,920,854 | A * | 7/1999 | Kirsch et al. | 1/1 |
| 5,920,859 | A * | 7/1999 | Li | 715/205 |
| 5,940,624 | A * | 8/1999 | Kadashevich et al. | 704/9 |
| 6,070,158 | A * | 5/2000 | Kirsch et al. | 1/1 |
| 6,101,491 | A * | 8/2000 | Woods | 707/696 |
| 6,363,373 | B1 * | 3/2002 | Steinkraus | 1/1 |
| 6,473,753 | B1 * | 10/2002 | Katariya et al. | 1/1 |
| 6,549,897 | B1 * | 4/2003 | Katariya et al. | 1/1 |
| 6,694,331 | B2 | 2/2004 | Lee | |

(Continued)

OTHER PUBLICATIONS

Brin et al.; The Anatomy of a Large-Scale Hypertextual Web Search Engine; Computer Networks and ISDN Systems 30; 1998; Elsevier Science; pp. 107-117.*

*Primary Examiner* — Andrew Dyer
(74) *Attorney, Agent, or Firm* — Mark R. Malek; Zies Widerman & Malek

(57) ABSTRACT

A document analysis system receives multiple concepts along with multiple reference documents and generates sensory indicators that assist a researcher in assessing the relevance of each of the documents to the concepts. In one exemplary aspect, the document analysis system displays a table of keywords separated into blocks, each block of keywords corresponding to one of the concepts. Each block is colored according to the prevalence of any keyword within a given keyword group. The color of a block thus indicates the relative presence of a concept in the document. The document analysis system also determines a unique color for each block of keywords for highlighting in the text of the document. In this manner a researcher can quickly identify passages that contain multiple concepts. Additionally, the researcher is provided the ability to quickly locate reference characters, figure numbers and patent numbers in the document.

45 Claims, 17 Drawing Sheets

(56) References Cited

U.S. PATENT DOCUMENTS

| | | |
|---|---|---|
| 6,823,331 B1 | 11/2004 | Abu-Hakima |
| 7,181,438 B1 * | 2/2007 | Szabo ................................. 1/1 |
| 7,194,693 B2 | 3/2007 | Cragun |
| 7,333,984 B2 | 2/2008 | Oosta |
| 7,702,611 B2 * | 4/2010 | Chi et al. ............... 707/999.001 |
| 7,711,747 B2 | 5/2010 | Renders et al. |
| 7,716,226 B2 * | 5/2010 | Barney ......................... 707/748 |
| 7,925,652 B2 * | 4/2011 | Merz et al. .................... 707/727 |
| 7,933,911 B2 | 4/2011 | Watanabe |
| 7,971,150 B2 | 6/2011 | Raskutti et al. |
| 8,219,550 B2 * | 7/2012 | Merz et al. .................... 707/727 |
| 8,606,815 B2 * | 12/2013 | Chen et al. .................... 707/777 |
| 2002/0138473 A1 | 9/2002 | Whewell |
| 2003/0005258 A1 * | 1/2003 | Modha et al. ..................... 712/1 |
| 2004/0113916 A1 | 6/2004 | Ungar |
| 2005/0010559 A1 | 1/2005 | Du |
| 2005/0210042 A1 | 9/2005 | Goedken |
| 2006/0156222 A1 | 7/2006 | Chi |
| 2007/0027902 A1 | 2/2007 | Ponte |
| 2007/0233692 A1 | 10/2007 | Lisa |
| 2008/0103886 A1 * | 5/2008 | Li et al. ........................... 705/14 |
| 2008/0114750 A1 * | 5/2008 | Saxena et al. ..................... 707/5 |
| 2008/0301095 A1 | 12/2008 | Zhu |
| 2009/0276694 A1 | 11/2009 | Henry |
| 2010/0145940 A1 * | 6/2010 | Chen et al. .................... 707/736 |
| 2012/0204104 A1 | 8/2012 | Walsh |

* cited by examiner

Fig. 2K

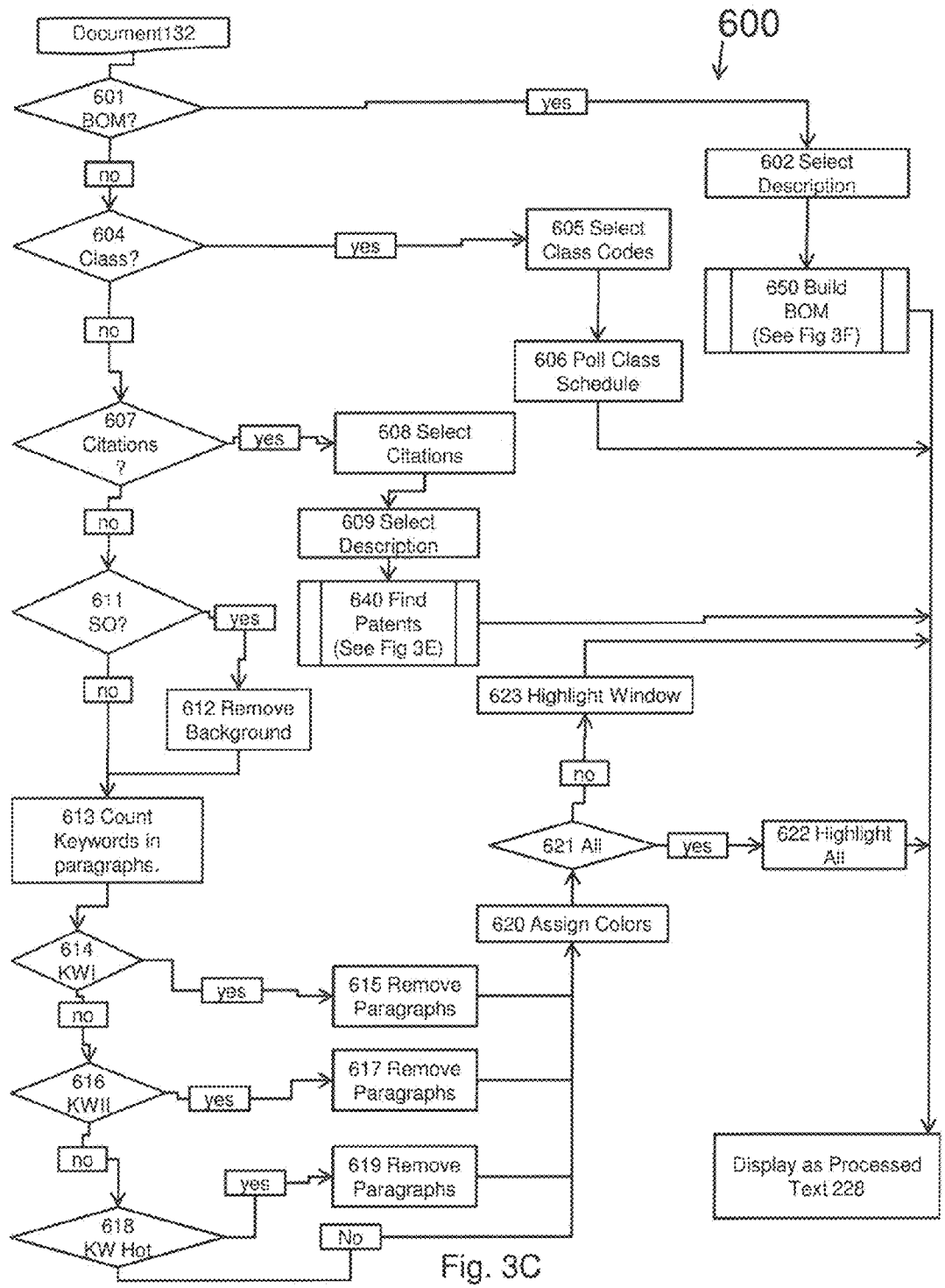

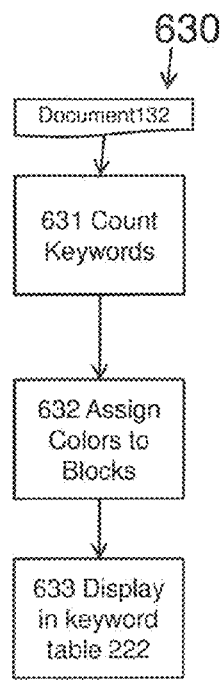
Fig. 3D

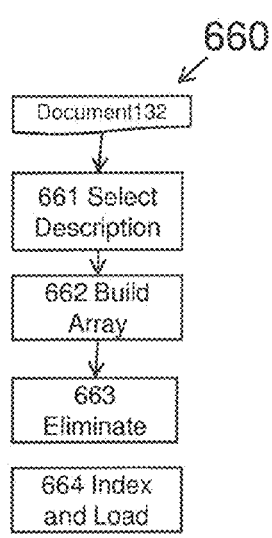
Fig. 3G
| Block Color Scheme | |
|---|---|
| Color | Highest Occurring Keyword |
| Red | 0 |
| Yellow | 5 |
| Green | 9 |
Fig. 3H
| Document Text Color Scheme | |
|---|---|
| Color | Keyword Group Number |
| Red | 1 |
| Blue | 2 |
| Green | 3 |
| Orange | 4 |
| Purple | 5 |
Fig. 3I

METHOD AND SYSTEM FOR DOCUMENT PRESENTATION AND ANALYSIS

RELATED APPLICATIONS

This application claims the benefit of U.S. Provisional Patent Application Ser. No. 61/250,557 filed on Oct. 11, 2009 by the inventor of the present invention, the entire contents of which are incorporated herein by reference.

FIELD OF THE INVENTION

The present invention relates to the field of document analysis, and more particularly to methods and systems for rapidly determining relevancy of one or more documents.

BACKGROUND

Document research involves identifying relevant subject matter or concepts within a document or set of documents. Search engines, for example, use "key" words or phrases as search arguments to locate text passages containing those words or phrases. The passages may or may not be relevant, however, regardless of the instance of the argument. Finding relevant subject matter involves not just the instance of the word or phrase, but the context in which it is found. The preceding and succeeding words that surround a keyword in a passage influence the meaning or effect of its use.

Sometimes the search for context, as opposed to an instance of a keyword, can be narrowed by using additional descriptive terms. Boolean operators are used by almost all search engines to link words separated by the operators in some logic set. For example, the operator "AND" implies the set of all instances of word number one used in conjunction with word number two; the operator "OR", by contrast, implies the set of all instances of word number one combined with the set of all instances of word number two. In mathematical language, the first set is an intersection set and the second, a union set.

Wildcards, indicated by some symbol like "*" or "$", can be used to substitute for letters, prefixes or endings, thereby picking up the alternative forms in which a word might appear. Proximity indicators, such as "ADJ", "NEAR", "WITH" and "SAME", are used together with Boolean operators to indicate how far apart two words may appear in a text passage. This gives the document researcher a means for assessing context. Two words used in the same sentence, or in the same paragraph, can indicate a contextual nexus.

In the current state-of-the-art, finding contextual meaning involves reading whole passages or entire documents where keywords are located. Since the quality of document research is defined in the negative as not missing any relevant passages in a field of inquiry, the researcher can ill-afford to simply spot-read. Search engines can find the keywords, but it is the reading task that defines not only the quality but the time spent on a properly conducted search exercise. Any artifice which reduces reading time without compromising quality becomes highly desirable for productivity reasons.

U.S. Published Application No. 20050210042 to Goedken shows methods and apparatus to search and analyze prior art. Goedken shows the benefit of grouping conceptually related words to a single color, and then highlighting those words in the text of a patent document. Goedken also recognizes the benefit of counting elements for reporting purposes (see FIG. 14a). Goedken, however, does not show a system for rapidly displaying the text of a document alongside an indexed color coded chart for allowing quick navigation and quickly showing the user prevalence of various concepts inside of a document. These are important shortcomings because the patent researcher requires a system for acquiring an initial understanding of a document in 1-2 seconds. The patent researcher must view thousands of documents in a typical search, and if the initial document inquiry takes more than a few seconds, then a patent search can become economically unfeasible.

U.S. Published Application No. 20060156222 to Chi shows a method for automatically performing conceptual highlighting in electronic text. Chi has also noticed that conceptually related words can be grouped together and highlighted the same color. However, Chi has not provided for additional features that enable rapid initial understanding of a document. For example, Chi doesn't teach methods of removing passages of no relevance to the reader's interest. In addition, Chi doesn't show methods of removing all but the most relevant passages. Moreover, Chi also doesn't show a method of providing rapid understanding (1-2 seconds) of a document, such that a researcher can make the quick decision of whether or not to start reading a document.

U.S. Pat. No. 7,194,693 to Cragun shows an apparatus and method for automatically highlighting text in an electronic document. However, highlighting is determined by user preferences and scroll speed. Cragun does not show features that allow rapid, staged understanding of a document that are required by the researcher wrestling with large numbers of long documents.

U.S. Pat. No. 6,823,331 to Abu-Hakima shows a concept identification system and method for use in reducing and/or representing text content of an electronic document. Although Abu-Hakima provides for counting and ranking, there are no tools for rapid understanding of the document once it is presented.

U.S. Published Application 20090276694 to Henry shows a System and Method for Document Display. Like the present invention, Henry has found the usefulness in presenting reference characters along with names on or near the figures to which they relate. However, Henry has not taught a search system where the reference characters are rapidly located for the searcher, and presented for quick navigation through the document. Moreover, Henry has decided to retrieve characters from drawings, where the present invention contains a method for hunting patent text for reference characters.

U.S. Published Application 20040113916 to Ungar shows a perceptual-based color selection for text highlighting. The text color choice is based upon factors such as the total amount of highlighted display.

Several problems still exist in prior art. First, most search systems rely on a researcher to limit a document set using a combination of keyword and classification. But since a researcher is looking for multiple concepts simultaneously, limiting a search with a set of keywords will inevitably miss references showing the concepts that were not part of the immediate search. This is exacerbated when a searcher is looking for ten or more concepts simultaneously. Clearly, a better system would involve reviewing large sets of documents for all concepts simultaneously. However, the labor involved in reading large sets of long documents makes this approach impractical. Therefore, a system is required that enables rapid manual review of large sets of lengthy documents for multiple concepts simultaneously.

Embodiments of the present invention address many of the shortfalls in the prior art while presenting, what will hereinafter become apparent to be, a pioneering document analysis technology.

BRIEF SUMMARY OF THE PRESENT INVENTION

It is a first object of the present invention to enable location and loading of groups of words having relevance in a research project. It is a second object to provide an interface that enables rapid (1-2 second) first level of relevance determination through color coding of concept blocks. Yet another object of the present invention is to provide an interface that enables quick (5-10 second) second level of relevance determination through multi-colored highlighting of keywords. It is yet another object to provide multiple user options for removal of non-relevant passages in a document. Yet another object is to provide for optional display of only the highest relevance passages for high speed patent searching. Still another object is to provide an interface that enables rapid location in patent text of any reference numeral from the figures. Yet another object is to provide an interface that enables rapid location of passages related to figure numbers. Still another object of the present invention is to provide an interface with rapid location of patent and published application numbers inside a body of text.

The present invention is a document presentation system that enables a researcher to quickly assess relevance of a document in the context of a search project. With the present invention, the researcher can locate potentially relevant areas of a document database, and then review large numbers of documents for the presence of multiple concepts. The invention contains GUI tools that enable the researcher to first load multiple keyword groups into blocks of conceptually related keywords. As the researcher navigates from document to document, the keywords are counted, and the keyword blocks are colored according the highest keyword occurrence in each keyword block. This enables the researcher to make a first level of relevance determination within a 1-2 seconds of loading the document. If multiple colors aside from red are observed, the researcher can then inspect for passages of relevance. Only passages containing a user specified number of keywords are presented, so that the researcher does not read and page through long documents. In addition, each passage has all keywords color coded, such that all keywords from a given block are made the same color. When the researcher observes multi-colored passages, he or she can quickly inspect the passage by scanning from keyword to keyword—enabling a second level of understanding within just 5-10 more seconds. In addition, the researcher is provided with the ability to scroll the document from keyword to keyword by clicking in the keyword blocks. Particularly dense keyword areas are shown on a keyword density scrollbar enabling the researcher to jump directly to keyword dense sections of the document. In addition, the researcher can instruct the interface to automatically remove all but the most relevant passages—which are defined as those with the highest number of keyword blocks represented therein. Moreover, the document is processed to present a bill of material (BOM) table and a figures table, both of which provide document navigation. With these navigation tools, a patent researcher can view patent images in one window and quickly locate passages in the text where reference characters reside (using the BOM table) or where figures are discussed (using the figs table). In addition, the interface presents any patent numbers or published application numbers discussed in the document, which provides quick adding of applicant cited documents to a standard backward citation search. An additional tool provides the ability to tag each document according to relevance and according to presence or absence of multiple user defined concepts.

BRIEF DESCRIPTION OF THE DRAWINGS

FIG. 2K is an interface diagram in accordance with an exemplary embodiment of the invention.

FIG. 3C is a flow diagram illustrating a process that may be carried out in accordance with the exemplary system of FIG. 1.

FIG. 3D is a flow diagram illustrating a process that may be carried out in accordance with the exemplary system of FIG. 1.

FIG. 3G is a flow diagram illustrating a process that may be carried out in accordance with the exemplary system of FIG. 1.

FIG. 3H is a block color scheme table.

FIG. 3I is a document text color scheme table.

DETAILED DESCRIPTION

Reference will now be made in detail to the present exemplary embodiments of the invention, examples of which are illustrated in the accompanying drawings.

Figure 1A:
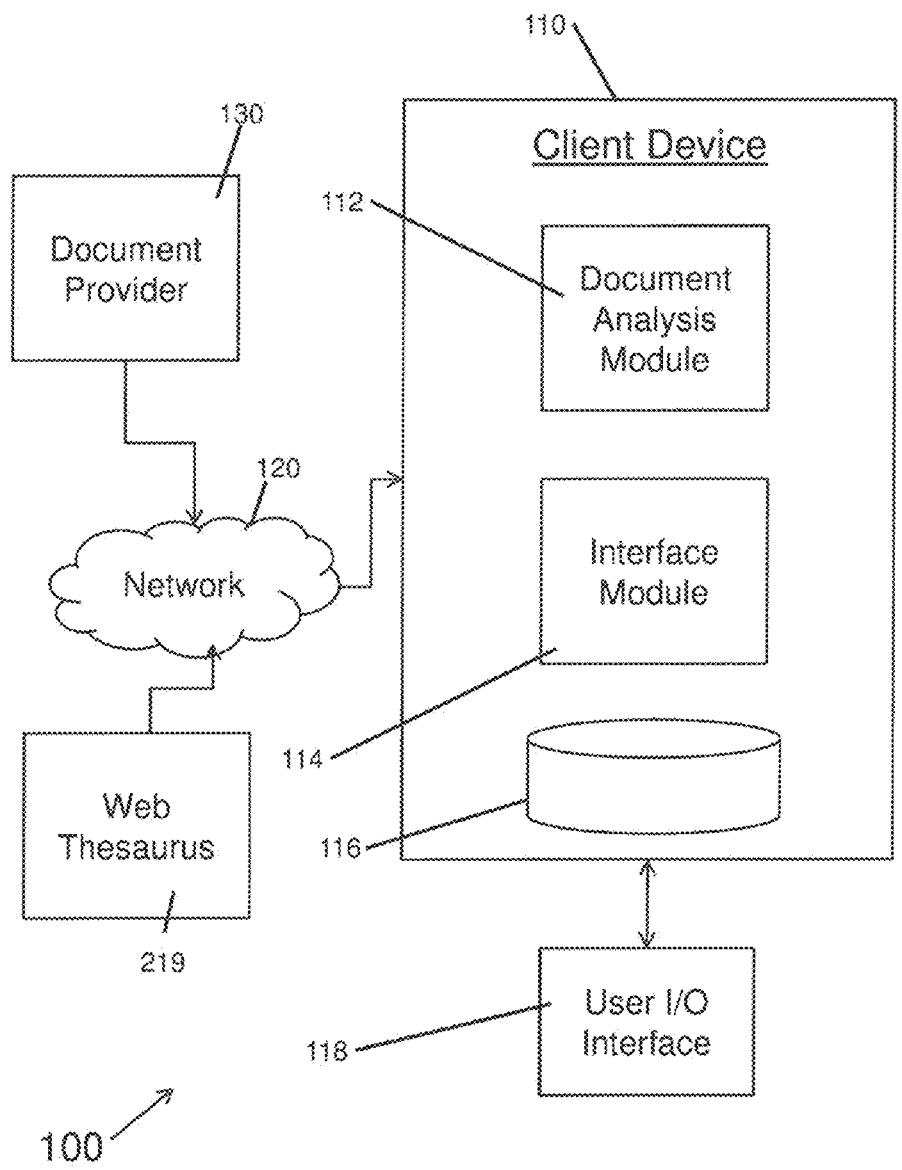
FIG. 1A is a block diagram illustrating a document analysis system in accordance with an exemplary embodiment of the invention.
Figure 1B:
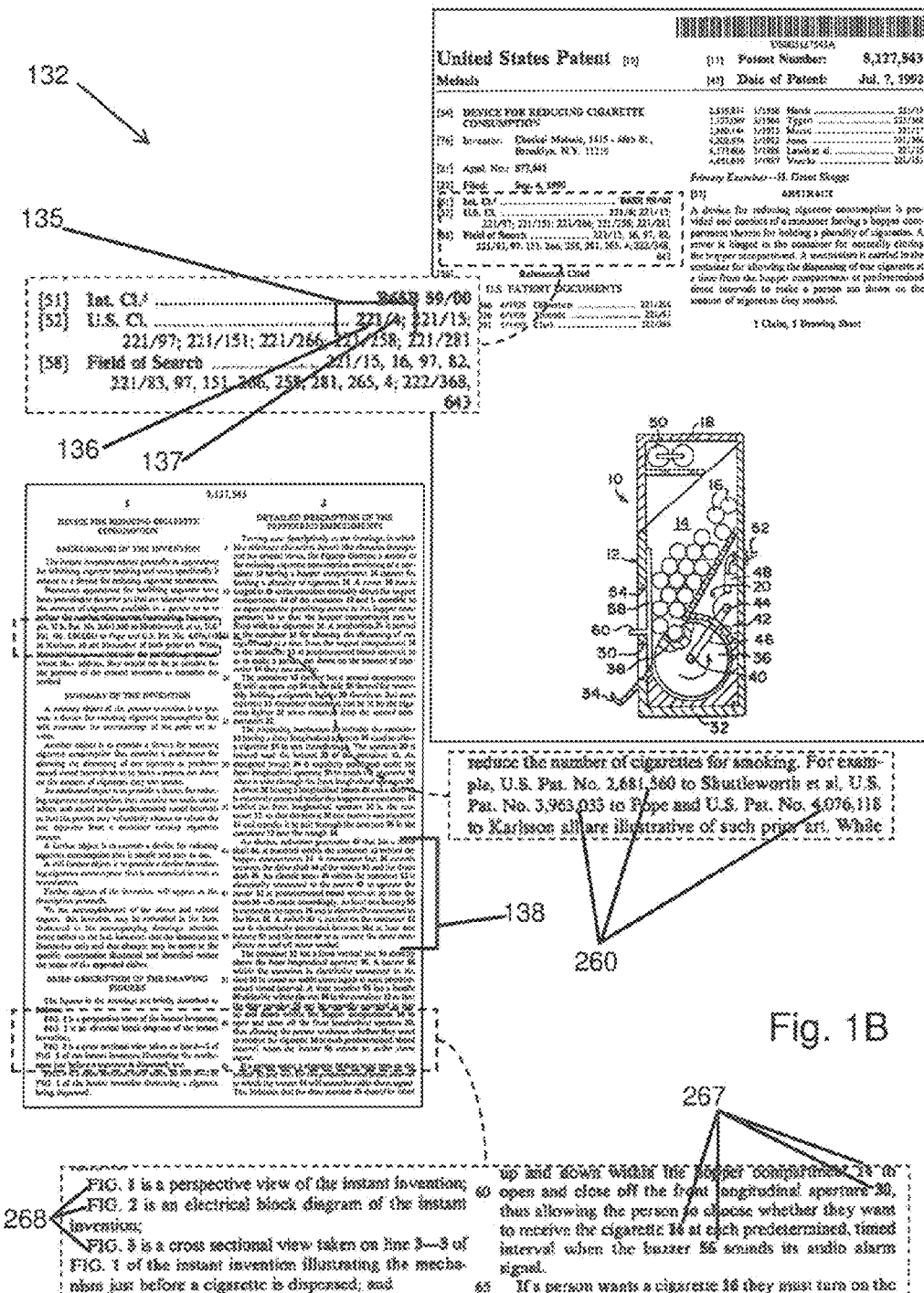
FIG. 1B is a sample of a document.

Referring to FIG. 1, a block diagram is shown illustrating a document analysis system 100 in accordance with an exemplary embodiment of the invention. The document analysis system 100 comprises a client device 110. The client device 110 includes a document analysis module 112, an interface module 114 and a user Input/Output (I/O) interface 118. By way of example, the client device 110 may be a computing device having a processor such as personal computer, a phone, a mobile phone, or a personal digital assistant. The document analysis system 100 may also comprise a document provider 130 and a network 120. The document provider 130 is configured to deliver one or more documents, labeled generally as 132. By way of example, the documents 132 may be electronic files containing patent data or any type of electronic file that contains textual data. See FIG. 1B for an example of a document 132. As seen, the document 132 has multiple document classifications 135 that are further divided into a class 136 and a subclass 137. In addition, notice the body of the document is composed of multiple sections (eg. Abstract, description, claims), and that section are further divided into document paragraphs 138. The document 132 may also contain BOM items 267, which are also known as reference characters, patent reference numbers 260, and figure numbers 268. The document provider 130 may be a remote server running a search engine such as that provided by the United States Patent and Trademark Office (USPTO) FreePatentsOnLine, Micropatent®, Delphian®, Patent-Cafe®, Thompson Innovation or Google®. The document provider 130 may retrieve the data from a local repository or from one or more remote documents repositories. Examples of such a document repository include patent databases including those provided by EP (European patents), WO (PCT publications), JP (Japan abstracts) and DWPI (Derwent World Patent Index for patent families). The document provider 130 may alternatively be a cloud based bulk storage system such as Amazon Simple Storage Service. The interface module 114 is configured to receive one or more documents 132 from the document provider 130 by way of network 120. By way of example, the network may be the Internet. The interface module 114 may alternatively be configured to receive one or more documents 132 through the user I/O interface 118. In such an embodiment, the documents 132 may be stored on a portable storage device (not shown) such as a CD, DVD or solid state device and the user I/O interface 118 may include a communications interface such as a wireless interface, a CD/DVD drive or a USB drive for retrieving data from the personal storage device. The documents 132 may alternately be paper-based documents and may be provided to the interface module 114 by use of a scanner (not shown) that is configured with the I/O interface 118. The client device 110 may also include a data storage element 116. The interface module 114 is also configured to receive a set of one or more concepts from a researcher by way of the I/O interface 118. The I/O interface 118 may also include at least one input device such as a keyboard, mouse, microphone or a touch screen for receiving the concepts from the researcher. Each concept is comprised of one or more text-based keywords or sets of text-based keywords which are used by the document analysis module 112 to analyze each of the documents 132. The document analysis module 112 generates statistical data based on the user-defined concepts and the documents 132. The statistical data may be used by the researcher to quickly assess the relevancy of each document 132 to each of the user-defined concepts. The document analysis module 112 may transmit the statistical data to the interface module 114 which presents the data to the researcher by way of the I/O interface 118. The I/O interface 118 may also include a display such as an LCD or CRT monitor configured to display a graphical user interface (GUI) for presenting information such as the statistical data to the researcher. The GUI will now be discussed in greater detail.

Figure 2A:
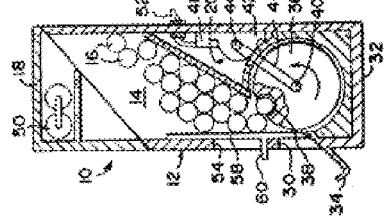
FIG. 2A is an interface diagram in accordance with an exemplary embodiment of the invention.
Figure 2B:
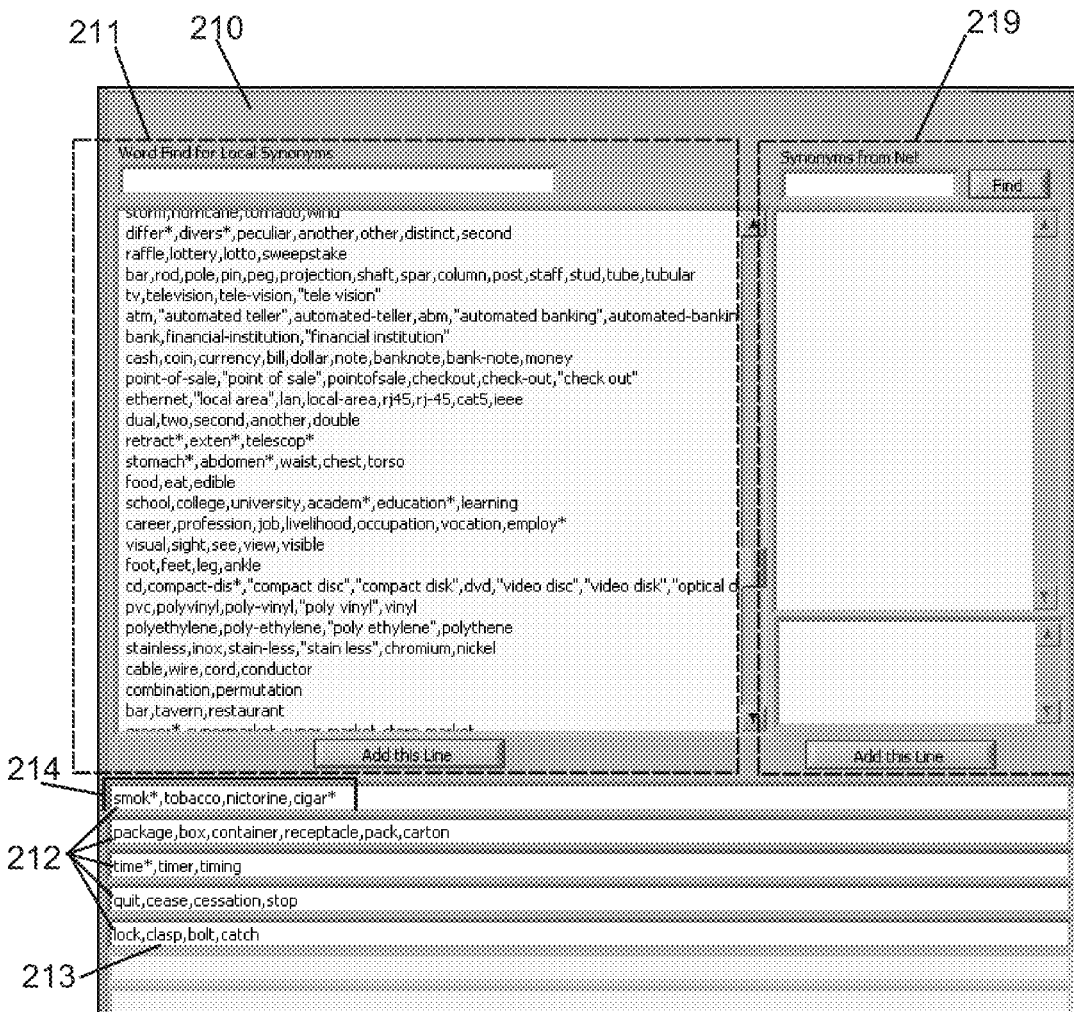
FIG. 2B is an interface diagram in accordance with an exemplary embodiment of the invention.
Figure 2C:
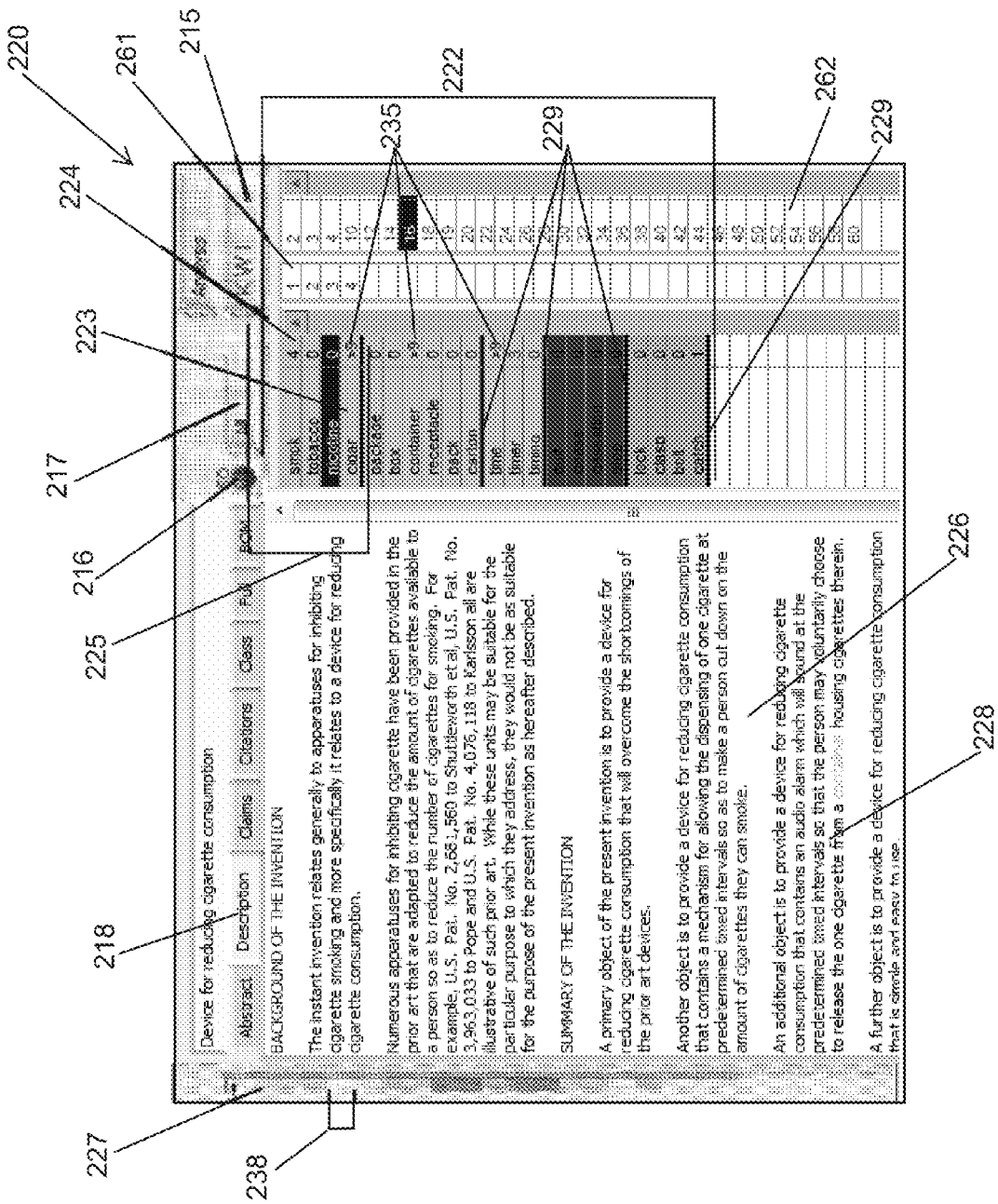
FIG. 2C is an interface diagram in accordance with an exemplary embodiment of the invention.
Figure 2D:
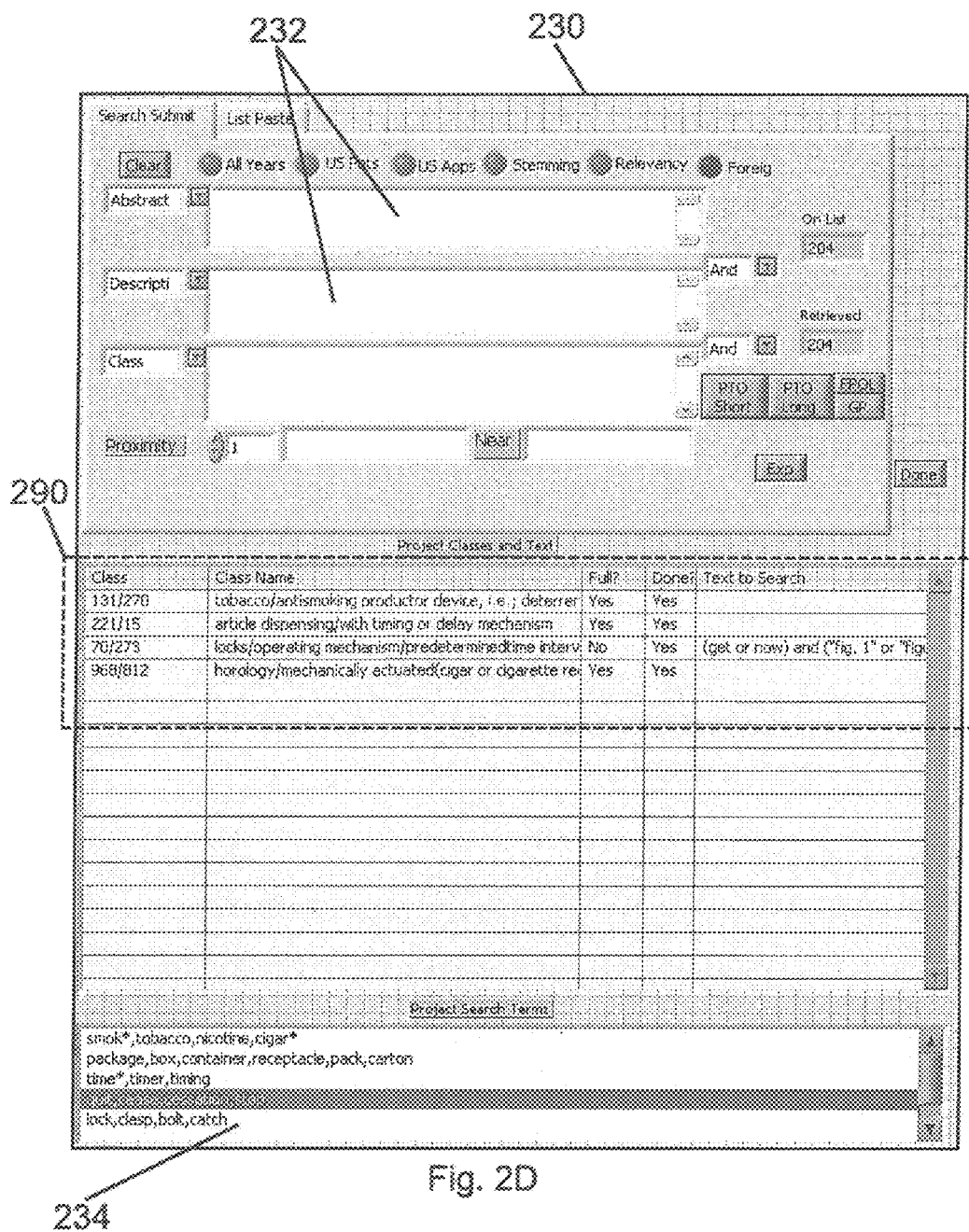
FIG. 2D is an interface diagram in accordance with an exemplary embodiment of the invention.
Figure 2E:
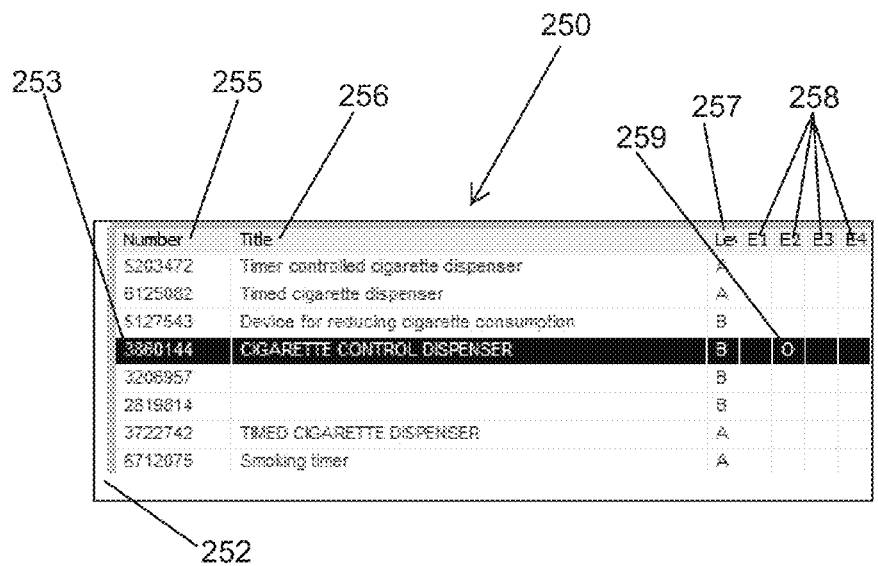
FIG. 2E is an interface diagram in accordance with an exemplary embodiment of the invention.
Figure 2F:
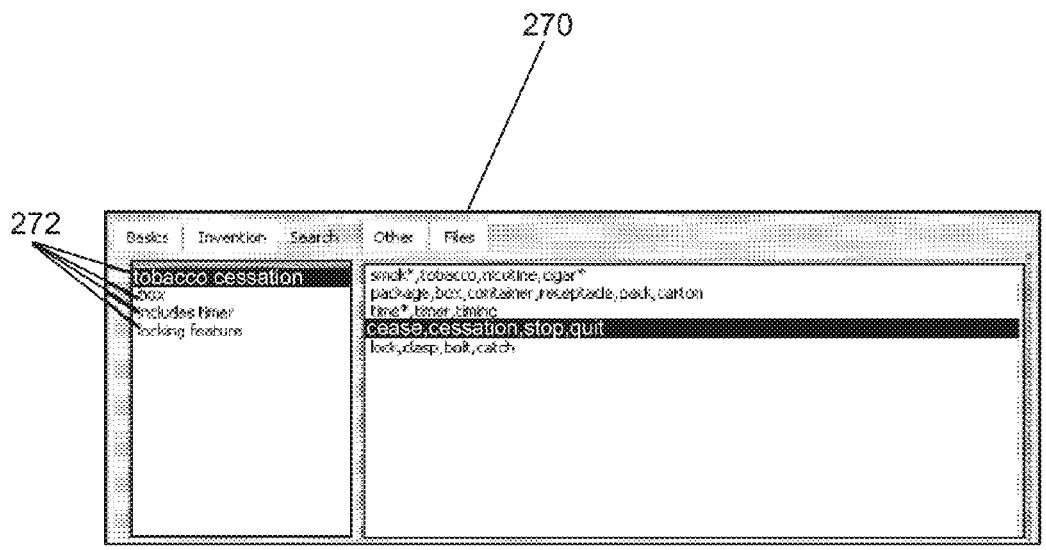
FIG. 2F is an interface diagram in accordance with an exemplary embodiment of the invention.
Figure 2G:
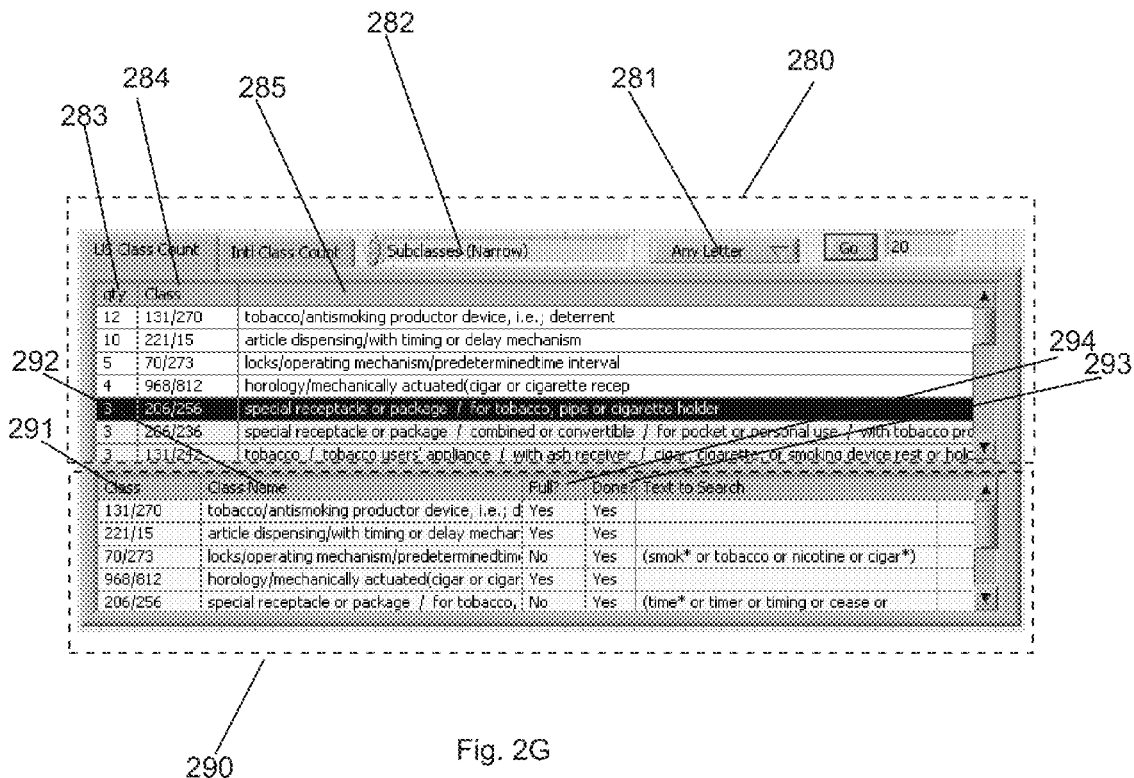
FIG. 2G is an interface diagram in accordance with an exemplary embodiment of the invention.
Figure 2H:
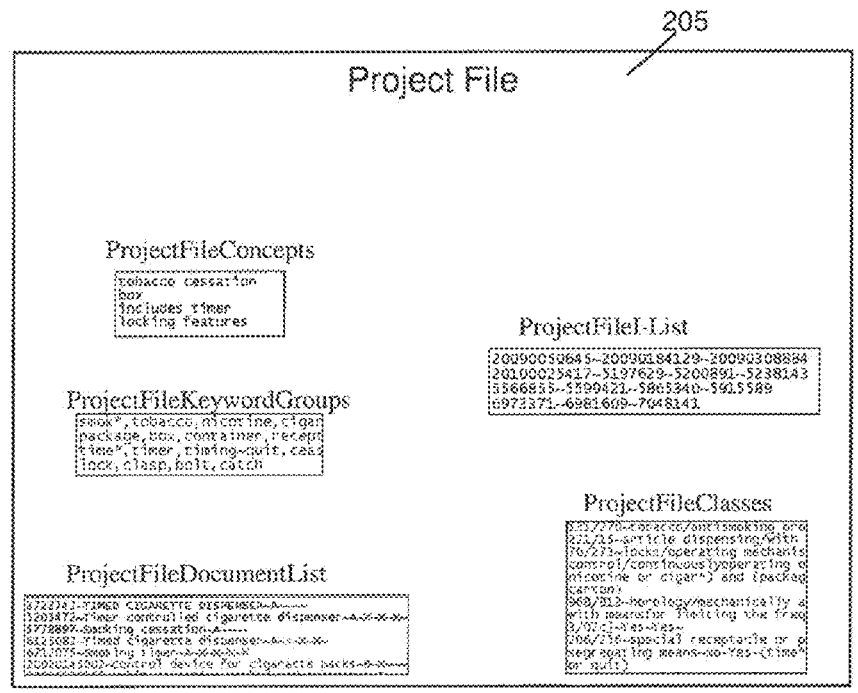
FIG. 2H is a diagram of a project file created and used by the present invention.

Referring now to FIG. 2A FIG. 2B, FIGS. 2C, 2D, 2E, and 2F, diagrams are shown illustrating a document analysis graphical user interface (GUI) 200 in accordance with an exemplary embodiment of the invention. FIG. 3A-F which illustrates an exemplary computer-implemented process 300 for performing document analysis will also be discussed. At a first step labeled as 310, the interface module 114 will receive concept data from the researcher. The interface module 114 first generates a document analysis GUI 200 and displays the GUI 200 to the researcher by way of the display device included with user I/O interface 118. As shown in FIG. 2A, the document analysis GUI 200 includes a document relevance interface 220, a document management interface 250, and a document image window 254. The document image window 254 displays non-textual data such as images or drawings that may be associated with the currently selected document thus providing an additional means for assessing the relevance of the document. As seen in FIG. 2F, the researcher may start a research project by entering one more concepts 272. Each concept 272 may have one or more words or word groups associated therewith. As shown in FIG. 2B, the document analysis GUI 200 includes a keyword entry interface 210. The keyword entry interface 210 comprises multiple rows of alphanumeric entry fields 212. One or more keywords 213 may be entered by a researcher into each entry field 212, wherein each keyword 213 is conceptually related such that each line represents a keyword group 214. The researcher is also provided with a user thesaurus 211 and web thesaurus 219. The user thesaurus 211 can be edited and stored in a data storage element 116, and the web thesaurus 219 may be accessed through the network 120 by the interface module 114. Five alphanumeric entry fields 212 are shown to be filled in FIG. 2B. Each concept 272 and corresponding keyword group 214 may be determined manually by the researcher or may be received from an external source. By way of example, the concepts may be reduced to a manageable number of concepts (e.g. 4-5 concepts). Keywords 213 may then be chosen for each of the concepts and entered into one of the alphanumeric fields 212 to form the keyword group 214. After entering each of the desired concepts, the researcher may then exit the keyword entry interface 210 and proceed to analysis of a set of documents based on the user-defined concepts.

At a next step labeled as 320 the interface module 114 will receive one or more documents 132. As discussed the interface module 114 is configured to receive the one or more documents 132 from the document provider 130 by way of network 120. The interface module 114 may be configured to allow the researcher to request a predetermined set of documents 132. By way of example, the researcher may initiate a request for a specific set of patent documents or a set of patent documents that fall within a specific category or classification. The researcher may also initiate a search of a remote document repository through a search interface window 230 (shown in FIG. 2D) provided by the document analysis GUI 200. The search may be initiated by entering a set of search parameters, such as keywords, into one or more search fields 232 located on the search interface window 230. Boolean operators, wildcards and proximity indicators may be used to link the keywords together in logic sets. The search interface window 230 may also provide a search assistance window 234 that allows the previously defined keywords 213 to be added to the set of search parameters in response to a user action (e.g. a mouse click). The search assistance window 234 thereby facilitates the loading of search parameters into the one or more search fields 232. In addition, the researcher is provided with a classification search list 290, which contains a table for documenting the search project strategy (discussed in detail later). The researcher may pick classification codes from the classification search list 290. As discussed, the interface module 114 may alternatively be configured to receive one or more documents 132 through the user I/O interface 118. In such an embodiment, the documents 132 may be stored on a portable storage device (not shown) such as a CD, DVD or solid state device and the user I/O interface 118 may include a communications interface such as a wireless interface, a CD/DVD drive or a USB drive for retrieving data from the personal storage device. Upon receiving the one or more reference documents 132 the interface module 114 will populate a document management table 252 located on a document management interface 250 (shown in FIG. 2E) with selectable rows 253 each having information descriptive of one of the received reference documents 132. By way of example, each row may include a reference document number 255 and document title 256.

At a next step, labeled as 330, the document analysis module 112 performs analysis of the one or more reference documents 132 received by the interface module 112 relative to the user-defined concepts also received by the interface module 112. As shown in FIG. 2C the document analysis GUI 200 includes the document relevance interface 220. The document relevance interface 220 comprises a keyword table 222 and a document text window 226. When the researcher selects (by way of a mouse click or similar navigation event) one of the rows that appear in the document management table 252, processed text 228 or corresponding text of the reference document becomes viewable in the document text window 226. Each keyword entered in alphanumeric entry fields 212 is listed in a separate row of a first column 223 of the keyword table 222. The keyword table 222 also includes a second column 224. The second column 224 displays a numeric value that represents the number of times the corresponding keyword in the first column 223 appears in the processed text 228 of the currently selected document. The keywords are arranged in keyword blocks 225, wherein each block 225 contains all of the keywords from a single keyword group 214. In addition, each keyword block 225 has a highest occurring keyword 235, which is the highest occurring keyword from the block. The keyword blocks 225 may be visually separated by bold horizontal bars, labeled generally as 229. When a document is first selected by the researcher, the document analysis module 112 will retrieve the document 132 through the interface module 114 and generate the processed text 228. The document analysis module 112 will use a block color scheme 236 to determine a color for each keyword block 225. According to the block color scheme 236, the color is determined from the highest occurring keyword 235 in each keyword block 225. The keyword table colors are selected by the document analysis module 112 from one of a set of predetermined colors in the block color scheme, each color corresponding to a range of instances of appearances of a keyword in the document 132. See FIG. 3H for an example of a block color scheme 236. As seen, red signifies lowest occurrence, and green signifies highest occurrence. All intermediate integers receive different colors along a red-green continuum. After determining a color for each keyword block 225, the document analysis module 112 will instruct the interface module 114 at step 340 to highlight each corresponding block 225 with that color. By viewing the colored keyword blocks 225 in the keyword table 222, a researcher may then make a rapid decision regarding the potential relevance of the selected document 132 to the previously defined concepts. More specifically, the researcher can use the colored keyword blocks 225 to make an initial relevance assessment within 1-2 seconds. If multiple colors, other than red, are observed in the initial relevance assessment, the researcher may then scan the processed text 228 to locate paragraphs having multiple colors, which would correspond to multiple concepts. If multi-colored paragraphs are noticed, the researcher may then decide to read portions of the processed text 228 to make a second determination as to relevance within 5-10 seconds. Finally, a researcher may view the original document 132 in the document image window 254 to make a final determination for tagging the document 132.

In addition, the count of instances for each keyword 213 may be transformed by the document analysis module 112 into a normalized count so that the length of the selected document 132 is substantially eliminated as a variable. The computation for the normalized count involves dividing the totality of the text characters in the selected document by five (average letter count for a word in the English language) to a normalized word count. Next, the count of instances for each keyword 213 is divided by the normalized word count to find density. This is followed by multiplying density by 2500 (arbitrary constant) and rounding to result in the normalized count expressed in integers. In one aspect of the exemplary embodiment, one of the keyword table colors is associated with a normalized count value of 10 or greater, another keyword table color with a value of 9, and a third keyword table color with a value of 8, and so on until the zero color is assigned. Steps 330 and 340 may be repeated for each of the received reference documents 132 as indicated by dashed arrow 350.

As seen in FIG. 2C, a keyword density scrollbar 227 may also be provided having integrated colors which correspond to such sections of text where highlighted keywords are tightly grouped. By way of example, the scrollbar 227 may be divided vertically into density sections 238, wherein the number of sections corresponds to the number of document paragraphs 138 appearing in the processed text 228. Colors may be assigned to each density section 238 according to the number of keyword groups 214 that appear in each document paragraph 138. The researcher can then rapidly scroll through long documents directly to areas where multiple keyword groups 214 are represented.

As discussed, when the researcher selects one of the rows that appear in the document management table 252 the processed text 228 of the corresponding reference document 132 becomes viewable in the document text window 226 and an image of the document 132 becomes viewable in the document image window 254. In addition, the document analysis module 112 will assign a unique keyword color to each block of keywords (each block of keywords corresponding to one concept) for subsequent highlighting in the document text window 226. Thereby, each keyword within a keyword block 225 or logical set of keywords will have the same unique color. The document analysis module 112 then instructs the interface module 114 at step 340 to display the keywords highlighted with the corresponding unique keyword colors in the document text window 226. In this manner, a scrolling scan of the displayed text may reveal sections of text where highlighted keywords are tightly grouped together. When keywords highlighted with different colors appear within a section, such a localized array might indicate a confluence of concepts and a nexus of context. The need for reading can be reduced by the collage of highlighted words in the localized array, the collage potentially communicating the meaning of a passage in the same way that a word with missing letters is recognizable. Thus a quick confirmation of relevance can be made by a person in a glancing inspection.

Figure 3A:
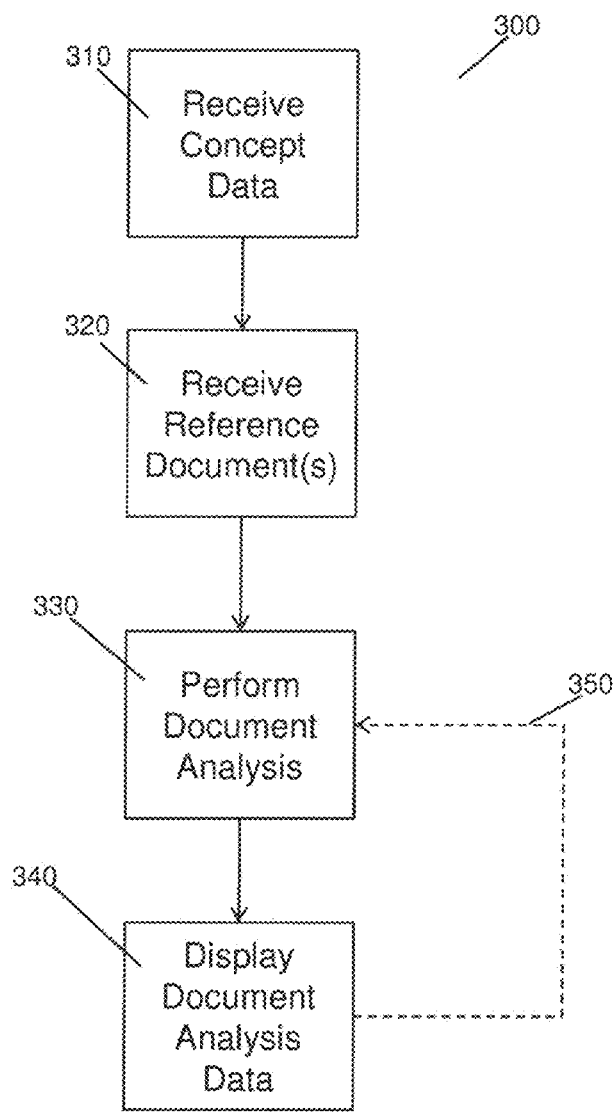
FIG. 3A is a flow diagram illustrating a process that may be carried out in accordance with the exemplary system of FIG. 1.
Figure 3B:
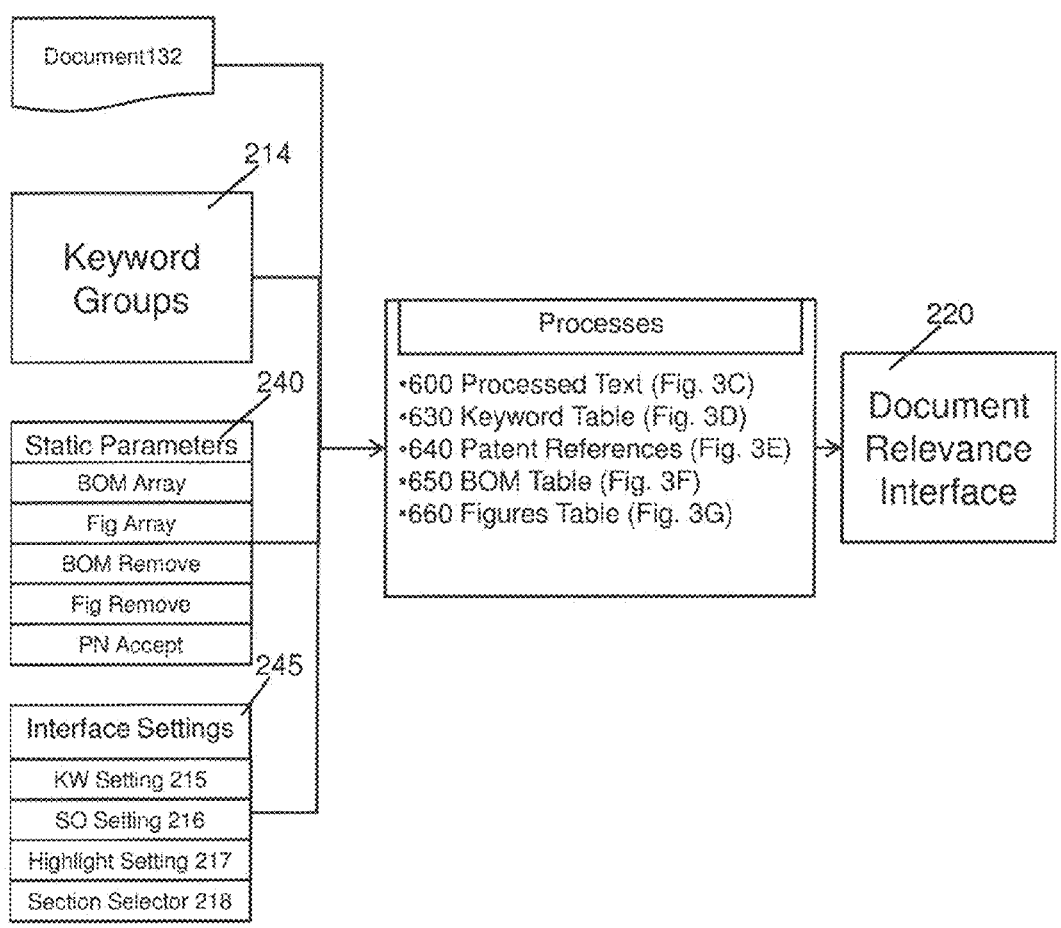
FIG. 3B is a flow diagram illustrating a process that may be carried out in accordance with the exemplary system of FIG. 1.

With reference now to FIGS. 3b-3g, the generation of the document relevance interface 220 will be discussed in greater detail. As seen in FIG. 3B, four basic inputs are the document 132, the keyword groups 214, the static parameters 240, and the interface settings 245. With these inputs, the document analysis module 112 runs processes 600, 630, 640 to generate the document relevance interface 220.

Process 600 Generate Processed Text 228

Referring to FIG. 2C and FIG. 3C process 600 begins when the researcher navigates to a document 132 using the document management interface 250. At 601, if section selector 218 is Bill of Material or (BOM) then proceed to 602, where the description field of the document is selected and passed to step 650. Here the "Build BOM" subroutine is executed and the resulting text becomes the processed text 228, which is displayed in the document text window 226. The result is a single column of the reference characters followed by item names. Returning to step 601 and proceeding to Step 604, if section selector 218 is "Class", then proceed to step 605, and select all document classifications 135. Next, at step 606, retrieve full class schedules for each document classification 135, which becomes the processed text 228 and is displayed in the document text window 226. Returning to step 604 and proceeding to Step 607, if section selector 218 is "Citations", then proceed to step 608. Select the Citations section of the document 132, and proceed to step 609. Select the description section of the document, and proceed to process 640. Append the examiner citations from the citations section to the patent and application numbers found in process 640. The resulting delimited list of patent reference numbers becomes the processed text 228, which is displayed in the document text window 226. Returning to step 607 and proceeding to Step 611, if Summary Only or SO=Yes, then proceed to step 612 and remove all text related to prior art and background by searching for words such as SUMMARY or BRIEF SUMMARY. Proceeding to step 613, first select the document section (ie. if section selector 218 is "Claims", select the claims section). Next, separate the selected section into an array of paragraphs using carriage returns as the delimiter to make 1d-array 670. Next, count the total number of occurrences of any keyword from each keyword group 214 in each paragraph in 1d-array 670, and store as 2d-array 671. Next, use the 2d-array 671 to find the number of different keyword groups 214 represented in each paragraph (ie the number of non-zero cells in each row of 2d-array 671), and store as 1d-array 672. Next, if Keyword Setting or KW Setting 215=KW1, then proceed to step 615, and remove all paragraphs from the 1d-array 670 having a corresponding number in 1d-array 672 of zero (so that the end display shows only paragraphs with at least one keyword group 214 represented). Returning to step 614, and on to step 616, if KW Setting 215=KWII, then proceed to step 617, and remove all paragraphs from the 1d-array 670 having a corresponding number in 1d-array 672 of zero or one (so that the end display shows only paragraphs with at least two keyword group 214 represented). Returning to step 616, and on to step 618, if KW Setting 215=KW Hot, then proceed to step 619, and remove all paragraphs from the 1d-array 670 having a corresponding number in 1d-array 672 that is less than the highest number found anywhere in 1d-array 672 (so that the end display shows only paragraphs with the highest number of keyword groups 214 represented). Next, assign colors to each density section 238 of the keyword density scrollbar 227 using the 1d-array 672 and a color scheme of 1) green=highest number in 1d-array 672, 2) red=0, 3) all intermediate numbers receive an intermediate color along the red-green spectrum. Moving now to step 620, assign unique colors to each keyword group 214 using a document text color scheme 237, wherein each color is picked for its ability to stand out on white background and also be contrasted from the other colors. See an example of the document text color scheme in FIG. 3i. At, step 621, if highlight setting 217=AII, then proceed to step 622 and convert 1d-array 670 to regular text, and highlight all keyword according to color scheme developed in step 620. Returning to step 621, and on to step 623, convert 1d-array 670 to regular text, and highlight the keywords in the visible window according to color scheme developed in step 620. Display as the processed text 228 in the document text window 226 of the document relevance interface 220.

Figure 2I:
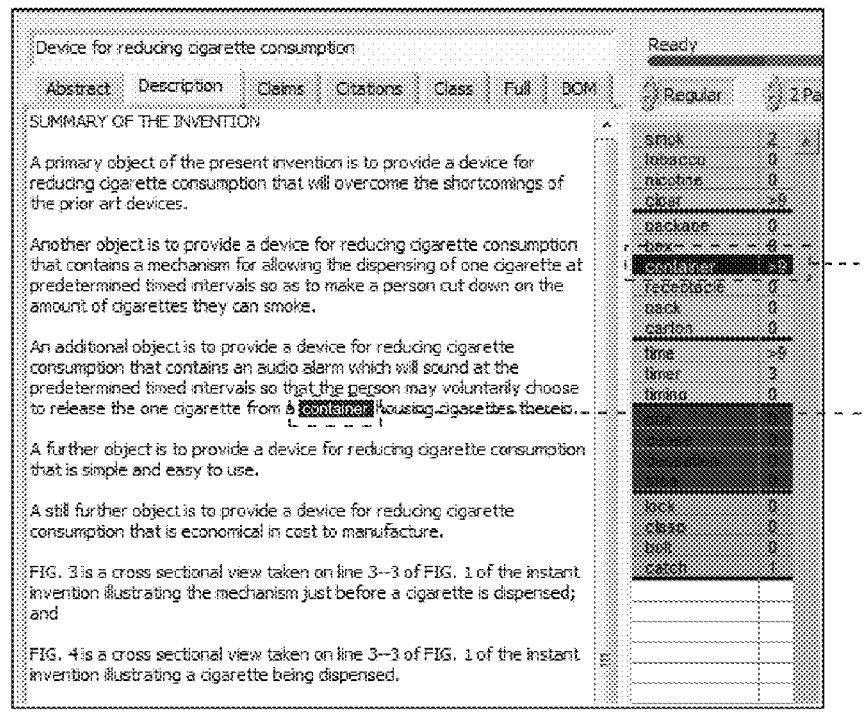
FIG. 2I is an interface diagram in accordance with an exemplary embodiment of the invention.

Process 630 Generate Keyword Table 222:

Referring to FIG. 3D, first at step 631, count the total number of each keyword 213 and store in 1d-array 673. Isolate the highest number representing each keyword group 214 from 1d-array 673, and store to 1d-array 674. Next at step 632, assign colors to 1-d array 674 according to the block color scheme 236 from FIG. 3H (i.e. red=0, yellow=5, green=10 or more, all intermediate numbers between 0 and 10 get a different color along a red-green continuum). Arrange the keyword groups 214 for display in the first column 223, and 1-d array 673 in the second column. Separate each keyword group 214 with a horizontal bar 229 to form multiple keyword blocks 225. Index processed text 228 against keywords 213, such that mouse clicks in any row will cause scrolling to keyword locations in text 228. As seen in FIG. 2i, the index provides the researcher with rapid scrolling to and bolding of the keyword that is clicked in the keyword table.

Figure 3E:
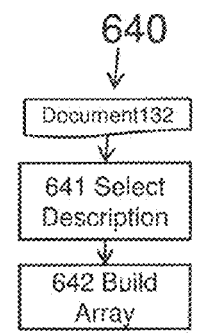
FIG. 3E is a flow diagram illustrating a process that may be carried out in accordance with the exemplary system of FIG. 1.

Process 640 Generate Patent References 260:

Referring to FIG. 3E, first step 641, Select the Description from the document 132, and convert all characters to lower case. Remove all non-alphabet and non-numeric characters such as slashes, commas, periods, etc. Next, at step 642, hunt for any words preceded by the phrases such as: "patent", "us", "u.s.", "no." If words are numeric, then add to a 1d array 675 of patent reference numbers 260. Next, hunt for any words that are 6, 7, or 11 characters long and are composed entirely of numeric characters, and add to 1d array 675.

Process 650 Generate BOM Table 262

Figure 3F:
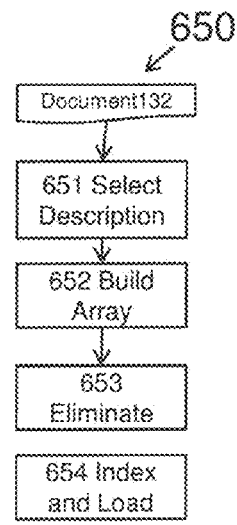
FIG. 3F is a flow diagram illustrating a process that may be carried out in accordance with the exemplary system of FIG. 1.

The BOM table will contain BOM items 267, which are also known as reference characters, and are found throughout patent text as seen in FIG. 1B. Referring to FIG. 3F. first step 651, select the description from document 132. Next, at step 652, search for words that start with numbers and load them to a BOM Candidate Array 676. Next, search for words that start with a left parenthesis and are immediately followed by a number, and add them to the BOM Candidate Array 676. Next, at step 653, retrieve three words previous to each element in the BOM Candidate Array 676. Eliminate candidates where the preceding words contain words such as fig, figure, or figs. Next, eliminate candidates that are not immediately succeeded by a space, right parenthesis, period, or comma. Index with processed text 228. Next at step 654, load the remaining candidate numbers into the BOM Table 642. Index BOM candidate array 676 with processed text 228, such that mouse clicks in any row will cause scrolling to BOM item locations in text processed 228. As seen in FIG. 2K, the index provides the researcher with rapid scrolling to and bolding of the BOM item 267 that is clicked in the BOM table.

Process 660 Generate Figs Table 261

The Figs table will contain figure numbers 268, which are found throughout patent text as seen in FIG. 1B. Referring to FIG. 3G, first step 661: Select description of document 132.

Figure 2J:
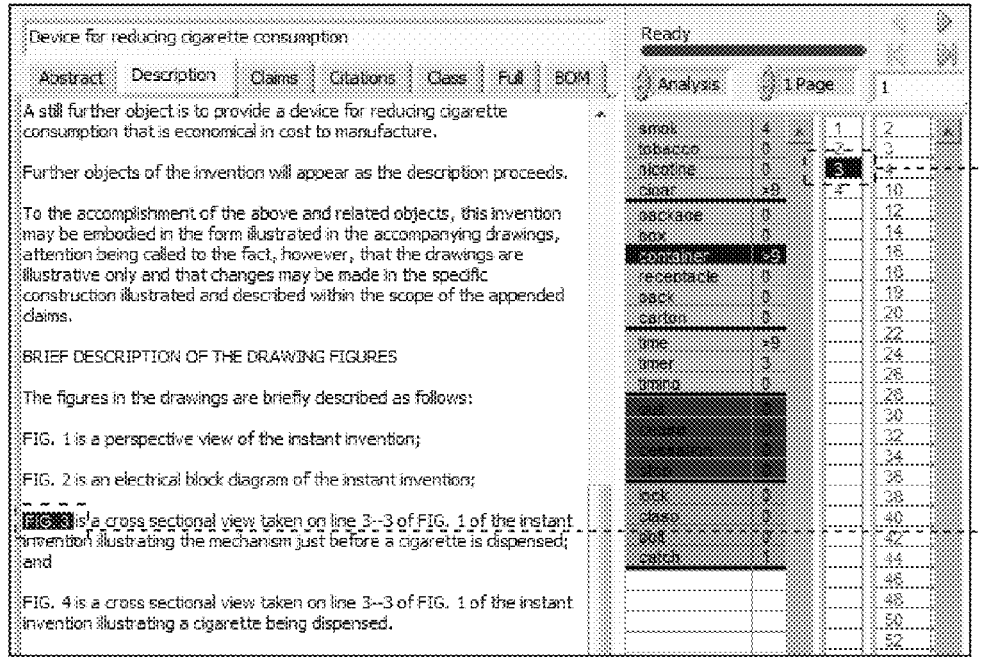
FIG. 2J is an interface diagram in accordance with an exemplary embodiment of the invention.
Figure 2K:
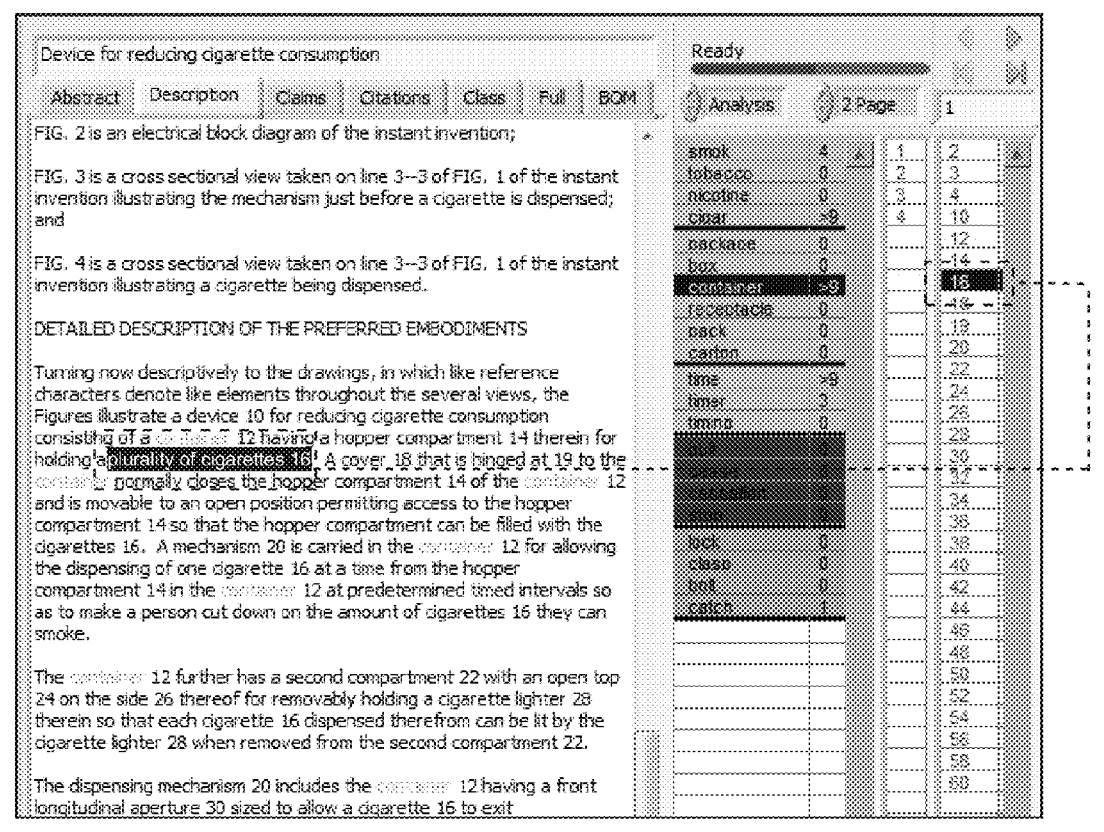

Next, at step 662, search for words immediately preceded by words such as fig, fig., figure, figs., figs, and add to a figs candidate array 677. Next, at step 663 Remove elements from the figs candidate array 677 that do not start with a number (i.e. allow 1, 2, 2C, 2D). Next at step 664 index with processed text 228, and load figs candidate array 677 and associated index (for quick mouse scrolling) into figs table 261. As seen in FIG. 2J, the index provides the researcher with rapid scrolling to and bolding of the figure number 268 that is clicked in the figs table.

Figure 4:
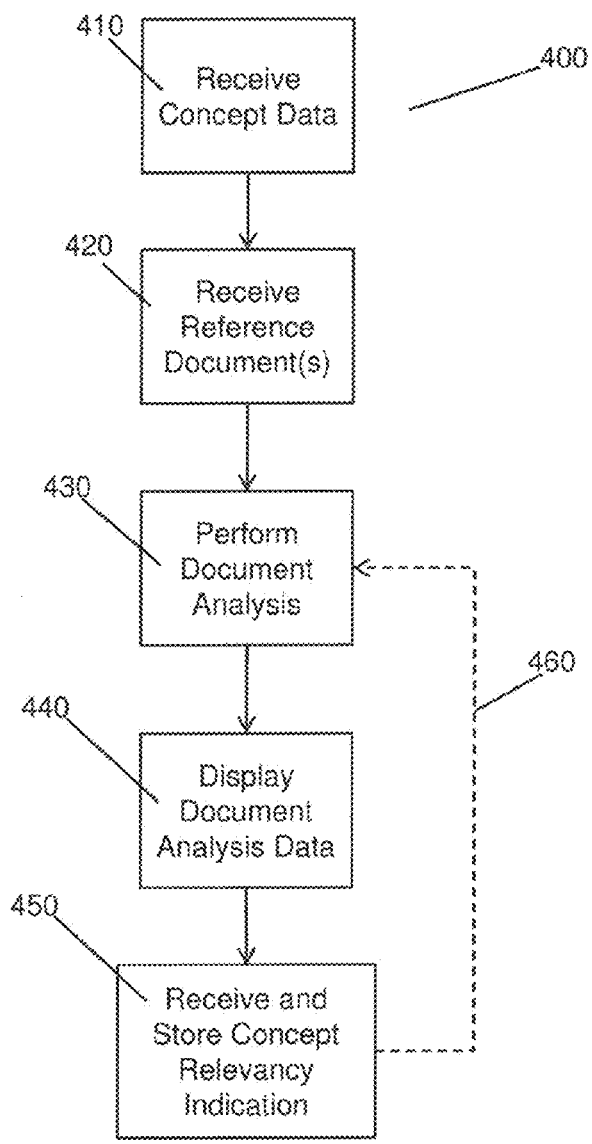
FIG. 4 is a flow diagram illustrating another process that may be carried out in accordance with the exemplary system of FIG. 1.

Referring now to FIG. 4, another exemplary method 400 for performing document analysis will now be discussed. Steps 410 through 440 proceed in a similar manner to steps 310 through 340 of the computer-implemented process 300. The present embodiment additionally provides an additional step 450 for receiving and storing data from the researcher that indicates the determined relevancy of the currently selected document 132 to the one or more user-defined concepts. As discussed, the interface module 114 will populate the document management table 252 (shown in FIG. 2E) with selectable rows 253 each having information descriptive of one of the received reference documents. In the exemplary embodiment, the document management table 252 also includes one or more additional columns for allowing the researcher to indicate (by way of a mouse-click or similar navigation event) the relevance of the currently selected document. Each row of the document management table 252 may have a relevancy value column 257 that contains an input field for indicating the overall relevancy of the associated reference document. By way of example the interface module 114 may provide the researcher with the ability to select an indicia (e.g. using a drop-down menu list) such as "A" for highest relevance, "B" for suspected relevance, and "C" for uncertain relevance. Irrelevant documents may be marked with an "I" to place a marker in the file indicating that a reference document was reviewed. Each row of the document management table 252 may also have one or more additional columns labeled generally as 258 that contain an input field for indicating whether a specific concept has been verified to appear in the currently selected reference document. The interface module 114 may provide the researcher with the ability to toggle a field (one such field is labeled as 259) corresponding to a specific concept "on" or "off" (e.g. by a mouse-click) when indicating whether a particular concept does or does not exist. A column may be provided for each of the previously discussed concepts. However, in another embodiment the interface module 112 may provide the researcher with a concept management window 270 (see FIG. 2F) for allowing the researcher to define different concepts 272 which the additional columns 258 may be derived from. In this manner, the researcher may be able to track higher-level or more abstract concepts than were initially defined and may also provide more user-friendly naming of the concepts (useful, for example, for report generation). The interface module 112 may also store the previously discussed relevancy indicators in a data repository such as the database labeled as 116 in FIG. 1. By storing each of the indicators the interface module 114 is able to generate reports that may include a reduced, and more relevant set of reference documents 132, than was initially received by the client device 110. Steps 430 through 450 may be repeated for each of the received reference documents 132 as indicated by dashed arrow 460.

In this manner a document analysis system is provided that includes a computing device having program modules executable by a processor, the program modules configured to rapidly transform a first set of set of data files representative of a plurality of reference documents into a second set of data files representative of a subset of the plurality of reference documents, the subset having textual content particularly relevant to one or more received concepts.

Figure 5:
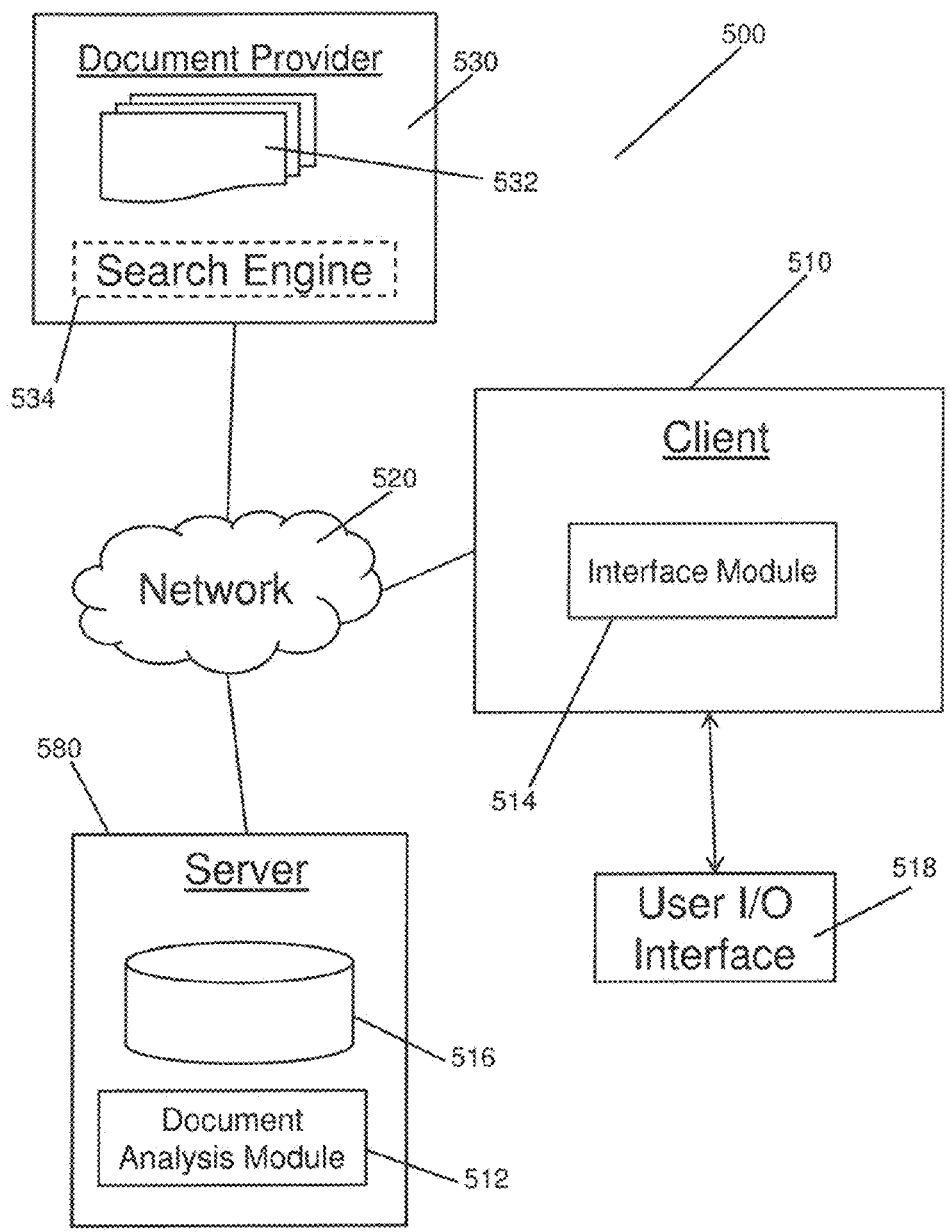
FIG. 5 is a block diagram illustrating a document analysis system in accordance with another exemplary embodiment of the invention.

Referring to FIG. 5, a block diagram is shown illustrating a document analysis system 500 in accordance with another exemplary embodiment of the invention. The document analysis system 500 is similar to the document analysis system 100 of FIG. 1 however provides a client-server architecture. Accordingly, document analysis system 500 includes a client device 510 and a server device 580. The server device 580 may be a computing device having a processor such as personal computer or may be implemented on a high performance server, such as a HP, IBM or Sun computer using an operating system such as, but not limited to, Solaris or UNIX. The server device 580 includes a document analysis module 512 similar in function to the document analysis module of 112 of the embodiment of FIG. 1.

Thus, a document analysis system having the benefits of allowing for rapid and accurate assessment of the relevancy of a document or set of documents to one or more concepts is contemplated. The document analysis system receives one or more concepts along with one or more reference documents and generates various sensory indicators that assist a researcher in assessing the relevance of each of the received documents to the received concepts. In one aspect, the document analysis system displays a table of keywords separated into blocks, each block of keywords corresponding to one of the concepts. The document analysis module will highlight each block of keywords with a color, the color based on the highest count of a keyword within each group of keywords. The color of a block thus indicates the relative presence of a concept in the document. In another aspect, the document analysis system determines a unique color for each block of keywords and then displays the text of the reference document with each occurrence of a keyword highlighted with the color of its associated keyword block. In this manner a researcher can quickly identify passages that contain multiple concepts.

The invention claimed is:

1. A document analysis and search system for searching through a plurality of documents and for analyzing documents located as a result of a conducted search, the search being directed to a predetermined subject matter, the system comprising:

a client device comprising at least one of a non-transitory computer readable medium and a memory;

a program module stored on the client device, the client device being positioned in communication with a network, and the network being in communication with a document provider database and a thesaurus database, the program module comprising instructions executable by a processor of the client device to locate at least one document from among the plurality of documents, the program module comprising an interface module; and a document analysis module;

wherein the interface module receives concept data relating to the subject matter of the search, the concept data including at least one concept, the concept including a plurality of keywords used to conduct the search;

wherein the interface module receives a plurality of documents relating to the concept data from the document provider database;

wherein the interface module generates and displays a document analysis graphical user interface, the document analysis graphical user interface comprising a keyword entry interface,
a document relevancy interface,
a document management interface, and
a document image window,
wherein the document analysis module generates statistical data based on the at least one concept, and wherein the statistical data is used to assess relevancy of each of the documents located in the search so that each of the documents can be displayed using the document relevancy interface and wherein the statistical data includes a count of a number of instances that each of the keywords appears in a document located in the search;
wherein the document analysis module transmits the statistical data to the interface module to be displayed;
wherein the document analysis module transforms the count of the number of instances of each of the keywords into a normalized count; and wherein the normalized count is calculated by dividing a total number of text characters in each document by five to provide a normalized word count, dividing the count of the number of instances of each of the keywords by the normalized word count to provide a density of each of the keywords, and multiplying the density of each of the keywords by a predetermined value to provide the normalized count;
wherein the keyword entry interface allows entry of one or more keyword groups, and wherein each keyword group includes a plurality of keywords that are conceptually related to one another.

2. A system according to claim 1 wherein the interface module allows for each of the documents located in the search to be manually assigned a relevancy value.

3. A system according to claim 1 wherein the document relevancy interface includes a keyword table and a document text window; and wherein corresponding text relating to at least one of the documents is displayed in the document text window.

4. A system according to claim 3 wherein the keyword table includes a first column to display the keywords used to conduct the search, and a second column to display a numeric value relating to the number of times each keyword appears in each of the documents located in the search.

5. A system according to claim 4 wherein the keywords in the keyword table are arranged in keyword blocks; and wherein each keyword block includes a keyword group.

6. A system according to claim 5 wherein the keyword table is color coded according to a block color scheme; and wherein the block color scheme assigns a color to each keyword appearing in a keyword block.

7. A system according to claim 6 wherein the color is assigned according to the highest occurring keyword from the block.

8. A system according to claim 7 wherein the block color scheme is a continuum between a first predetermined color and a second predetermined color, wherein the first predetermined color signifies zero occurrence of the highest occurring keyword from the block, and wherein the second predetermined color signifies a high occurrence of the highest occurring keyword from the block.

9. A system according to claim 8 wherein a document is considered relevant when colors other than the first predetermined color are displayed in the keyword table, and wherein a document is considered irrelevant when the first predetermined color is dominant in the keyword table.

10. A system according to claim 5 wherein the keywords occurring in the corresponding text displayed in the document text window are color coded according to a document text color scheme; wherein the document text color scheme assigns a color to each keyword from a keyword group; wherein each keyword group is assigned a different color; and wherein the different colors are chosen based upon ability to contrast against each other and against a white background of the document text window.

11. A system according to claim 10 wherein a document paragraph is considered relevant when multiple colors are displayed.

12. A system according to claim 11 wherein the document text window displays document paragraphs having a predetermined minimum number of different colors displayed therein; and wherein the predetermined minimum number of different colors is controlled by a keyword setting on the document relevance interface.

13. A system according to claim 11 wherein the document text window displays document paragraphs having a predetermined maximum number of different colors displayed therein; and wherein the predetermined maximum number of different colors is determined by counting the number of keyword groups represented in each paragraph and isolating the highest number of keyword groups represented in each paragraph.

14. A system according to claim 4 wherein the document relevancy interface further comprises a figures table; wherein the figures table displays one or more figure numbers located in the corresponding text of the document; and wherein the location of the figure numbers in the corresponding text is indexed.

15. A system according to claim 4 wherein the document relevancy interface further comprises a Bill of Material (BOM) table; wherein the BOM table displays one or more reference characters located in the corresponding text; and wherein the location of the reference character in the corresponding text is indexed.

16. A system according to claim 1 wherein the interface module is adapted to store the documents located as a result of the search on a portable storage device.

17. A system according to claim 1 wherein the documents located as a result of the search are paper-based documents, and wherein the documents are received by the interface module using a scanner in communication with the client device so that the documents are electronically readable using the client device.

18. A system according to claim 1 wherein the document image window displays non-textual data associated with the document.

19. A system according to claim 1 wherein the thesaurus further comprises a user thesaurus and a network thesaurus.

20. A system according to claim 19 wherein the user thesaurus includes a data storage element to store the keywords relating to the subject matter of the search and synonyms relating to the keywords; and wherein the data storage element is editable.

21. A system according to claim 1 further comprising a document search history display to display a historical record of the search.

22. A system according to claim 1 wherein the document graphical user interface further comprises a concept management window to allow for different concepts to be defined while the search is being conducted.

23. A system according to claim 1 wherein the document relevancy interface includes a keyword density scrollbar; wherein the keyword density scroll bar has a vertical section for each paragraph in the corresponding text; and wherein each vertical section is color coded according to the number of keyword groups represented in the paragraph.

24. A method for conducting a search through a plurality of documents and for analyzing the documents located as a result of the search, wherein the search is directed to a predetermined subject matter, the method comprising:

using a program module stored on at least one of a non-transitory computer readable medium and a memory of a client device to locate at least one document from among a plurality of documents;

communicating from the client device being to a network, and the network being in communication with a document provider database and a thesaurus database;

receiving concept data relating to the subject matter of the search, the concept data including at least one concept, the concept including a plurality of keywords used to conduct the search;

receiving a plurality of documents relating to the concept data from the document provider database;

generating and displaying a document analysis graphical user interface, the document analysis graphical user interface comprising a keyword entry interface, a document relevancy interface, a document management interface, and a document image window;

generating statistical data based on the at least one concept, the statistical data being used to assess relevancy of the at least one document located in the search so that the at least one document can be displayed using the document relevancy interface, wherein the statistical data includes a count of a number of instances that each of the keywords appears in a document located in the search;

transforming the count of the number of instances of each of the keywords into a normalized count; and wherein the normalized count is calculated by dividing a total number of text characters in each document by five to provide a normalized word count, dividing the count of the number of instances of each of the keywords by the normalized word count to provide a density of each of the keywords, and multiplying the density of each of the keywords by a predetermined value to provide the normalized count;

transmitting the statistical data to be displayed; and wherein the keyword entry interface allows entry of one or more keyword groups, and wherein each keyword group includes a plurality of keywords that are conceptually related to one another.

25. A method according to claim 24 further comprising manually assigning a relevancy value to the at least one document located in the search.

26. A method according to claim 24 wherein the document relevancy interface includes a keyword table and a document text window; and further comprising displaying corresponding text relating to at least one of the documents in the document text window.

27. A method according to claim 26 further comprising displaying the keywords used to conduct the search in a first column of the keyword table, and displaying a numeric value relating to the number of times each keyword appears in each of the documents located in the search in a second column of the keyword table.

28. A method according to claim 27 further comprising arranging the keywords in the keyword table in keyword blocks to form a keyword group; and wherein each keyword group includes a plurality of keywords that are conceptually related to one another.

29. A method according to claim 28 wherein the keyword table is color coded according to a block color scheme; and wherein the block color scheme assigns a color to each keyword appearing in a keyword block.

30. A method according to claim 29 wherein the color is assigned according to the highest occurring keyword from the block.

31. A method according to claim 30 wherein the block color scheme is a continuum between a first predetermined color and a second predetermined color; wherein the first predetermined color signifies zero occurrence of the highest occurring keyword from the block; and wherein the second predetermined color signifies a high occurrence of the highest occurring keyword from the block.

32. A method according to claim 31 wherein a document is considered relevant when colors other than the first predetermined color are displayed in the keyword table, and wherein a document is considered irrelevant when the first predetermined color is dominant in the keyword table.

33. A method according to claim 28 further comprising color coding the keywords occurring in the document displayed in the document text according to a document text color scheme; assigning a color to each keyword from a keyword group; assigning each keyword group a different color; and choosing different colors based upon ability to contrast against each other and against a white background of the document text window.

34. A method according to claim 33 wherein a document paragraph is considered relevant when multiple colors are displayed.

35. A method according to claim 34 further comprising displaying document paragraphs having a predetermined minimum number of different colors; and wherein the predetermined minimum number of different colors is controlled by a keyword setting on the document relevance interface.

36. A method according to claim 34 further comprising displaying document paragraphs having a predetermined maximum number of different colors; and wherein the predetermined maximum number of different colors is determined by counting the number of keyword groups represented in each paragraph and isolating the highest number of keyword groups represented in each paragraph.

37. A method according to claim 27 further comprising displaying one or more figure numbers located in the corresponding text of the document; and indexing the location of the figure numbers in the corresponding text.

38. A method according to claim 27 further comprising displaying one or more reference characters located in the corresponding text; and indexing the location of the reference character in the corresponding text.

39. A method according to claim 24 further comprising storing the documents located as a result of the search on a portable storage device.

40. A method according to claim 24 wherein the documents located as a result of the search are paper-based documents, and wherein the documents are received using a scanner in so that the documents are electronically readable.

41. A method according to claim 24 wherein the document image window displays non-textual data associated with the document.

42. A method according to claim 24 wherein the thesaurus further comprises a user thesaurus and a network thesaurus.

43. A method according to claim 42 wherein the user thesaurus includes a data storage element to store the keywords relating to the subject matter of the search and synonyms relating to the keywords; and wherein the data storage element is editable.

44. A method according to claim 42 further comprising selectively displaying a historical record of the search.

45. A method according to claim 42 wherein the document graphical user interface further comprises a concept management window to allow for different concepts to be defined while the search is being conducted.

* * * * *